United States Patent
Zheng et al.

(10) Patent No.: US 9,129,417 B2
(45) Date of Patent: Sep. 8, 2015

(54) METHOD AND SYSTEM FOR CORONARY ARTERY CENTERLINE EXTRACTION

(71) Applicants: Siemens Corporation, Iselin, NJ (US); Siemens Aktiengesellschaft, Munich (DE)

(72) Inventors: Yefeng Zheng, Dayton, NJ (US); Jianhua Shen, Princeton, NJ (US); Huseyin Tek, Jersey City, NJ (US); Gareth Funka-Lea, Cranbury, NJ (US); Fernando Vega-Higuera, Erlangen (DE); Dorin Comaniciu, Princeton Junction, NJ (US)

(73) Assignee: Siemens Aktiengesellschaft, Munich (DE)

(*) Notice: Subject to any disclaimer, the term of this patent is extended or adjusted under 35 U.S.C. 154(b) by 219 days.

(21) Appl. No.: 13/668,494

(22) Filed: Nov. 5, 2012

(65) Prior Publication Data

US 2013/0216110 A1    Aug. 22, 2013

Related U.S. Application Data

(60) Provisional application No. 61/601,233, filed on Feb. 21, 2012.

(51) Int. Cl.
  *G06K 9/00*   (2006.01)
  *G06T 7/60*   (2006.01)
  *G06T 7/00*   (2006.01)
  *G06K 9/34*   (2006.01)
  *G06K 9/62*   (2006.01)

(52) U.S. Cl.
  CPC .............. *G06T 7/606* (2013.01); *G06T 7/0012* (2013.01); *G06K 9/34* (2013.01); *G06K 9/342* (2013.01); *G06K 9/621* (2013.01); *G06T 2207/10081* (2013.01); *G06T 2207/30101* (2013.01); *G06T 2207/30172* (2013.01)

(58) Field of Classification Search
  None
  See application file for complete search history.

(56) References Cited

U.S. PATENT DOCUMENTS

| | | | |
|---|---|---|---|
| 6,047,080 A * | 4/2000 | Chen et al. | 382/128 |
| 7,447,535 B2 * | 11/2008 | Lavi | 600/407 |
| 7,916,919 B2 | 3/2011 | Zheng et al. | |
| 7,941,462 B2 | 5/2011 | Akinyemi et al. | |
| 8,073,227 B2 * | 12/2011 | Gulsun et al. | 382/131 |
| 2003/0171894 A1 * | 9/2003 | Giovanni Battista Mancini et al. | 702/182 |
| 2004/0082846 A1 * | 4/2004 | Johnson et al. | 600/410 |
| 2005/0048456 A1 * | 3/2005 | Chefd'hotel et al. | 434/267 |

(Continued)

OTHER PUBLICATIONS

M. Schneider and H. Sundar, "Automatic Global Vessel Segmentation and Catheter Removal Using Local Geometry Information and Vector Field Integration", IEEE, 2010: pp. 45-48.*

(Continued)

*Primary Examiner* — Vu Le
*Assistant Examiner* — Samah Beg

(57) ABSTRACT

A method and system for extracting coronary artery centerlines from 3D medical image volumes is disclosed. Heart chambers are segmented in a 3D volume. Coronary artery centerlines are initialized in the 3D volume coronary artery based on the segmented heart chambers. The coronary artery centerlines are locally refined based on a vesselness measure. A length of each coronary artery centerline is shrunk to verify that the coronary artery centerline is within a coronary artery. The coronary artery centerline is the extended using data-driven vessel tracing.

29 Claims, 6 Drawing Sheets

(56) References Cited

U.S. PATENT DOCUMENTS

| | | | |
|---|---|---|---|
| 2006/0067459 A1* | 3/2006 | Boese et al. | 378/4 |
| 2006/0235288 A1* | 10/2006 | Lavi | 600/407 |
| 2007/0019846 A1* | 1/2007 | Bullitt et al. | 382/128 |
| 2007/0058865 A1* | 3/2007 | Li et al. | 382/173 |
| 2007/0165917 A1* | 7/2007 | Cao et al. | 382/128 |
| 2007/0274579 A1* | 11/2007 | Cai et al. | 382/131 |
| 2008/0008369 A1* | 1/2008 | Koptenko et al. | 382/128 |
| 2008/0100621 A1* | 5/2008 | Aharon et al. | 345/424 |
| 2008/0101676 A1* | 5/2008 | Zheng et al. | 382/131 |
| 2008/0187182 A1* | 8/2008 | Abe | 382/115 |
| 2008/0187199 A1* | 8/2008 | Gulsun et al. | 382/131 |
| 2008/0219530 A1* | 9/2008 | Levanon et al. | 382/130 |
| 2008/0260205 A1* | 10/2008 | Von Berg et al. | 382/103 |
| 2008/0273777 A1* | 11/2008 | Luboz et al. | 382/130 |
| 2010/0067760 A1* | 3/2010 | Zhang et al. | 382/130 |
| 2010/0076296 A1* | 3/2010 | Mittal et al. | 600/408 |
| 2010/0172554 A1 | 7/2010 | Kassab et al. | |
| 2010/0266176 A1 | 10/2010 | Masumoto et al. | |
| 2010/0274430 A1* | 10/2010 | Dolgov et al. | 701/25 |
| 2010/0278405 A1* | 11/2010 | Kakadiaris et al. | 382/131 |
| 2011/0221756 A1 | 9/2011 | Inoue et al. | |
| 2011/0224542 A1* | 9/2011 | Mittal et al. | 600/425 |
| 2012/0134564 A1 | 5/2012 | Zheng et al. | |
| 2012/0207378 A1* | 8/2012 | Gupta et al. | 382/134 |
| 2013/0058555 A1* | 3/2013 | Miao et al. | 382/132 |
| 2013/0094745 A1* | 4/2013 | Sundar | 382/132 |
| 2013/0261445 A1* | 10/2013 | Ertel et al. | 600/431 |
| 2015/0049174 A1* | 2/2015 | Lee et al. | 348/50 |

OTHER PUBLICATIONS

Ramaswamy et al. "Fluid Dynamic Analysis in a Human Left Anterior Descending Coronary Artery with Arterial Motion," 2004 Annals of Biomedical Engineering (33) 12: pp. 1628-1641.*

Jandt et al. "Automatic generation of time resolved motion vector fields of coronary arteries and 4D surface extraction using rotational x-ray angiography," 2009 Phys Med Biol (54): pp. 45-64.*

Bouix et al. Flux driven automatic centerline extraction, Med Img Analysis, 2004, vol. 9, p. 209-221.*

* cited by examiner

METHOD AND SYSTEM FOR CORONARY ARTERY CENTERLINE EXTRACTION

This application claims the benefit of U.S. Provisional Application No. 61/601,233, filed Feb. 21, 2012, the disclosure of which is herein incorporated by reference.

BACKGROUND OF THE INVENTION

The present invention relates to cardiac imaging, and more particularly, to extracting centerlines of coronary arteries in 3D medical image data.

Cardiovascular disease (CVD) is the leading cause of death in the United States and coronary stenosis (i.e., narrowing of the vessel) is the most common CVD. Cardiac computed tomography (CT) is the primary non-invasive imaging modality used to diagnose coronary stenosis due to its superior image resolution. To facilitate diagnosis of coronary stenosis, coronary artery centerline extraction is a prerequisite for the subsequent quantification of the coronary stenosis in which a percentage of the lumen area blocked by plaques is measured. Various centerline extraction methods have been proposed. Most conventional centerline extraction methods are data-driven and attempt to trace a centerline from an automatically detected or manually specified coronary ostium. One prominent advantage of such approaches is the potential to handle anatomical variations of the coronary arteries. However, since no or little high-level prior information is used, such data-driven coronary artery extraction procedures are often pre-terminated at a severe occlusion or unusual centerline course may be generated. In clinical practice, it is desirable to assign a label (i.e., branch name) to each branch in the extracted coronary tree, or at least identify the four major arteries, i.e., the left main (LM) artery, the left anterior descending (LAD) artery, the left circumflex (LCX) artery, and the right coronary artery (RCA). However, labeling of the branches of the coronary artery tree is not an easy task if the coronary tree is not extracted completely or some branches are traced incorrectly into non-coronary structures. Such a two-step approach (coronary tree extraction followed by branch labeling) is not optimal. Each step is made more difficult due to the limited usage of high-level prior information. Accordingly, a coronary centerline extraction approach that improves the robustness of conventional data-driven approaches is desirable.

BRIEF SUMMARY OF THE INVENTION

The present invention provides a method and system for coronary artery centerline extraction in 3D medical image data. Embodiments of the present invention combine model-driven and data-driven approaches to coronary artery centerline extraction. Embodiments of the present invention are more robust under severe occlusions than data-drive approaches and extracted centerlines are already labeled, such that no additional vessel labeling procedure is necessary.

In one embodiment of the present invention, heart chambers are segmented in a 3D volume. A coronary artery centerline is initialized in the 3D volume for at least a portion of at least one coronary artery based on the segmented heart chambers. Points of the coronary artery centerline are locally refined. A length of the coronary artery centerline is shrunk to verify that the coronary artery centerline is within the at least one coronary artery. The coronary artery centerline is then extended using vessel tracing.

These and other advantages of the invention will be apparent to those of ordinary skill in the art by reference to the following detailed description and the accompanying drawings.

DETAILED DESCRIPTION

Figure 1:
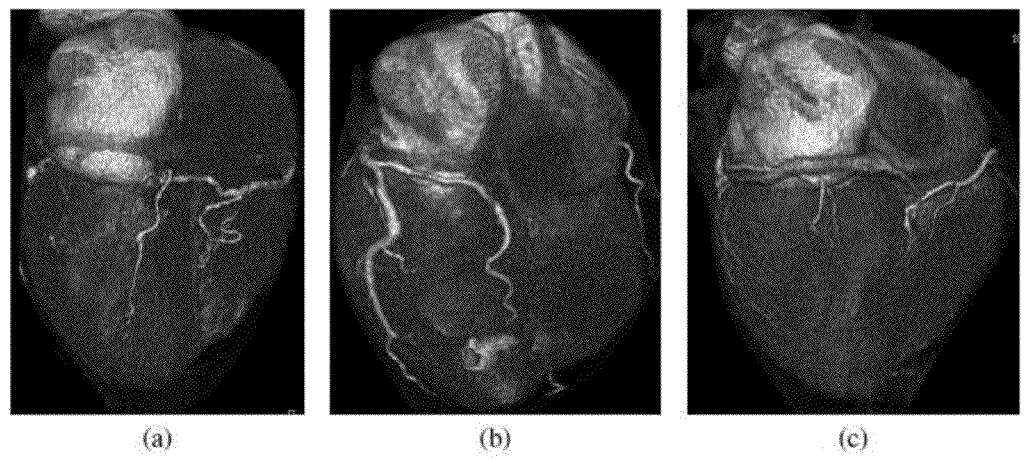
FIG. 1 illustrates variations in coronary dominance.

The present invention is directed to a method and system for coronary artery centerline extraction in 3D medical images. Embodiments of the present invention are described herein to give a visual understanding of the coronary artery centerline extraction method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Embodiments of the present invention extract coronary artery centerlines in medical image data by combining model-driven and data-driven approaches. Model-driven segmentation approaches use prior information to constrain detection and segmentation and are typically more robust than data-driven approaches. Marginal Space Learning (MSL) is a recently introduced model-driven approach for detecting and segmenting many anatomical structures, e.g., heart chambers, aorta, coronary ostia, etc., in various medical imaging modalities. The MSL approach utilizes machine learning techniques and is very robust under various imaging artifacts, and therefore even works well on low-quality 3D echocardiographic data. However, due to anatomical variations prevalent in coronary arteries, there are difficulties in directly applying a pure model-driven approach to coronary artery centerline extraction.

Previous work on coronary artery centerline extraction typically uses the coronary information, while ignoring other structures captured in a cardiac computed tomography (CT) volume. The relative position of the coronary arteries with respect to the heart chambers is quite stable. For example, the left anterior descending (LAD) artery runs on the anterior groove between the left and right ventricles, while the posterior descending artery (PDA) runs on the posterior interventricular septum groove. The left circumflex (LCX) artery and the right coronary artery (RCA) run inside the atrialventricular groove before extending toward the heart apex. Embodiments of the present invention utilize a hybrid centerline extraction approach, which combines the advantages of model-driven and data-driven approaches to extract four major coronary arteries (i.e., the left main (LM), LAD, LCX, and RCA). Embodiments of the present invention utilize a model-drive approach to enforce high level constraints to the proximal and middle segments of the coronary arteries, which can be consistently represented at relatively predictable positions. Using the model-driven approach, consistent portions of the coronary arteries are segmented. Embodiments of the present invention then apply a data-driven approach to verify and extend the centerlines of the coronary arteries segmented using the model-driven approach.

The hybrid approach used in embodiments of the present invention has a number of advantages as compared with conventional data-driven approaches. The hybrid approach is much more robust under severe occlusions. Occlusions mostly occur at the proximal or middle segments of an artery, and such segments are extracted in embodiments of the present invention using a robust model-driven segmentation approach. Furthermore, by combining model-driven and data-driven approaches, the hybrid approach can handle variations in length and topology of an artery. In addition, embodiments of the present invention combine the centerline extraction and vessel labeling into the same procedure. The extracted centerlines are automatically labeled and the results are more robust than in previous labeling approaches, which need to handle missing or incorrect tracing in the coronary tree.

The variations of the coronary artery can be classified into three categories, normal, normal variants, and anomalies. The normal anatomy refers to the anatomical pattern that the majority of people have. A normal variant refers to an alternative pattern that is relatively infrequent as compared to normal, but is seen in more than one percent of the population. In most cases, a normal variant is a benign variation without increased probability of cardiac disease. In contrast to a normal variant, an anomaly appears in less than one percent of the population and is often associated with pathologies. Anomalies can occur at the origin, course, and termination of an artery. The exact prevalence of these three categories depends on the specific variation of the population. For many coronary variations, the normal category accounts for 70-80% of people, normal variations account for 20-30%, and anomalies account for less than 1%.

An important anatomical variation to consider is the dominance of the coronary circulation. Different dominance patterns differ in which major coronary arteries feed the posterior descending artery (PDA) and poterolateral branch artery (PLB). If they are both fed by the RCA, it is right dominance. Right dominance is the normal anatomy with a prevalence of about 75%. For left dominant people (with a prevalence of about 10%), both the PDA and the PLB are fed by the LCX. The remaining cases are co-dominance with the PDA fed by the RCA and the PLB fed by the LCX. The hybrid approach used in embodiments of the present invention is capable of handling all of these normal variations in dominance. FIG. 1 illustrates variations in coronary dominance. As illustrated in FIG. 1, image (a) shows right dominance, in which both the PDA and PLB are fed by the RCA. Image (b) shows left dominance, in which both the PDA and PLB are fed by the LCX. Image (c) shows co-dominance, in which the PDA is fed by the RCA and the PLB is fed by the LCX.

Due to the anatomical variations (as shown in FIG. 1), it is impossible to have a single model for the major coronary arteries, not to mention the whole coronary tree. The LM is short and in an advantageous implementation, its centerline is uniformly resampled to eight points. The LAD is simple without topological variations, however, the distal segment of the LCX and RCA varies a lot in topology. Depending on the coronary dominance they may bifurcate into the PDA or PLB. Therefore, embodiments of the present invention model partial lengths of the LCX and RCA. Since both the LCX and RCA run inside the atrio-ventricular groove, we only model this part of the LCX and RCA.

Figure 2:
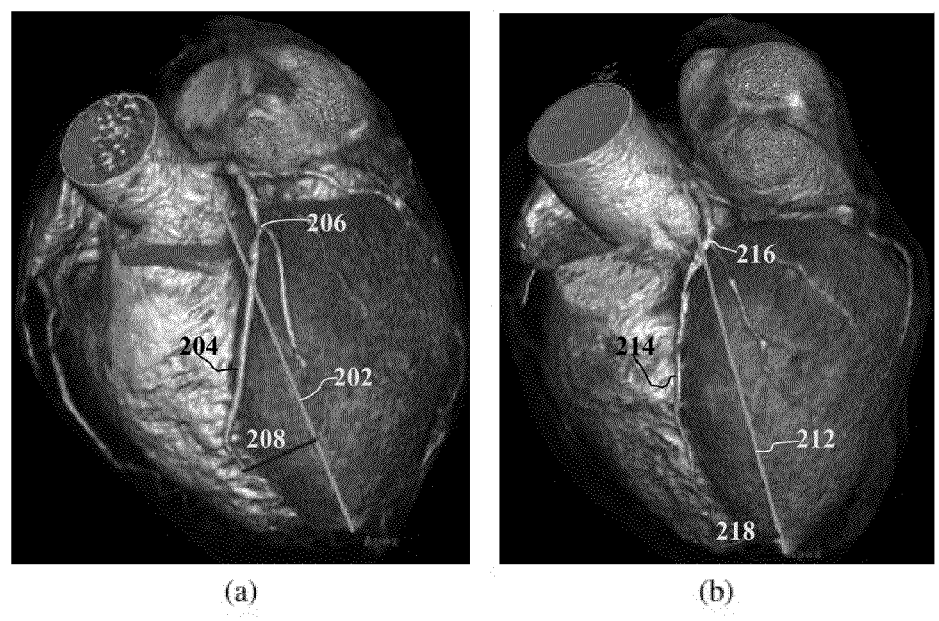
FIG. 2 illustrates measuring a relative length of the left anterior descending (LAD) coronary artery to perform truncation.

The visible length of an artery varies either due to anatomical variation or insufficient perfusion of contrast agent inside the artery. To handle the length variation in constructing a model for an artery, embodiments of the present invention truncate an artery into the same length in various training images. The size of the heart depends on the age and size of the patient, therefore a relative length measurement should be used for truncation. FIG. 2 illustrates measuring a relative length of the LAD to perform truncation. As shown images (a) and (b) FIG. 2, a distance 202, 212 between the left coronary ostium and the left ventricular apex is used to measure the relative length of the LAD 204, 214. In particular, the LAD 204, 214 is projected onto the ostium-apex line 202, 212, and the distance from the LAD origin 206, 216 (i.e., the LM bifurcation) to the most distal projection point 208, 218 is measured. As shown in FIG. 2, the relative LAD length is about 70% in image (a) and about 95% in image (b). Given a training set, the relative length is measured for all volumes and the truncation threshold is set to the lower 5th percentile by ignoring a few outliers in the training set with a very short artery. The truncation threshold can be tuned to adjust how much of the centerline is to be extracted using a model-driven approach and how much to leave for data-driven centerline extension. Datasets with an LAD shorter than the truncation threshold are removed and the LADs are truncated in the remaining datasets. Each truncated LADs is then evenly resampled to 64 points. On average, approximately 80% of the full length of LAD can be modeled. The LCX and RCA are truncated with a similar approach, but using the atrio-ventricular groove for the relative length measurement. Similar to the LAD, the LCX and RCA can also both be evenly resampled to 64 points.

Figure 3:
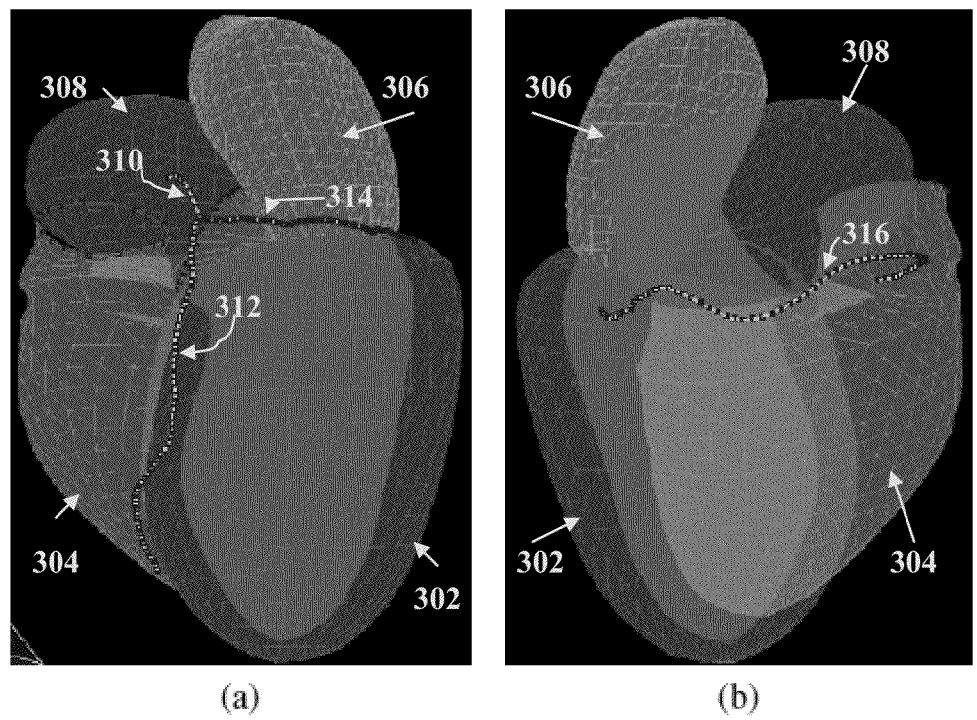
FIG. 3 illustrates a mean shape model of the heart chambers and coronary arteries extracted from a set of training data.

After extracting the consistent part of all major coronary arteries (LM, LAD, LCX, and RCA) from a set of training volumes, the extracted partial coronary artery models can be added to four-chamber heart model extracted from the training volumes. FIG. 3 illustrates a mean shape model of the heart chambers and coronary arteries extracted from a set of training data. As illustrated in FIG. 3, image (a) is an anterior view of the mean shape model and image (b) is a posterior view of the mean shape model. As shown in FIG. 3, the mean shape heart model includes surface models for the left ventricle 302, right ventricle 304, left atrium 306, and right atrium 308, and the relative position of the LM 310, LAD 312, LCX 314, and RCA 316 coronary arteries with respect to the chambers is embedded in the mean shape model, which can then be used to predict the initial positions of the coronary arteries on an unseen volume. The mean shape model is constructed as follows. First, a heart model of one of the training dataset is randomly selected as a template, and then the heart models of the remaining training datasets are aligned to the template using a similarity transformation. Since both the chamber meshes and coronary artery centerlines have intrinsic anatomical correspondence, the mean shape is calculated as a simple average of the 3D position of the corresponding points in the aligned heart models. The procedures of similarity transformation alignment and mean shape calculation are iterated a few times until convergence. The iterative procedure is advantageous in making the mean shape less dependent on the initial heart model template, to therefore better represent the whole shape population.

Figure 4:
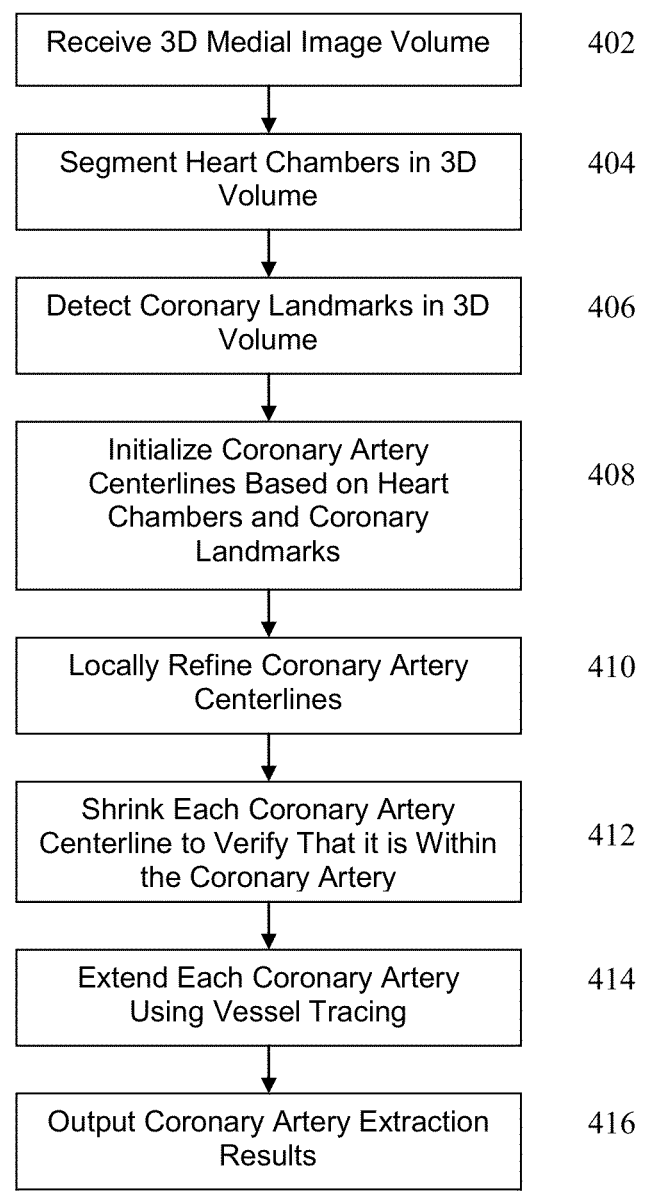
FIG. 4 illustrates a method of extracting coronary artery centerlines according to en embodiment of the present invention.

Embodiments of the present invention extract coronary artery centerlines in medical image data using a hybrid method including a model-driven stage to extract the centerline of the proximal and middle segments of each coronary artery and a data driven stage to verify and extend the centerline to the distal end. FIG. 4 illustrates a method of extracting coronary artery centerlines according to en embodiment of the present invention. In the method of FIG. 4, the steps 404-410 are performed in the model-driven stage and steps 412-414 are performed in the data-driven stage.

At step 402 a 3D medical image volume is received. For example, a 3D computed tomography (CT) volume or a 3D magnetic resonance imaging (MRI) volume can be received, but the present invention is not limited thereto and can be similarly applied to any imaging modality. The 3D volume can be received directly from an image acquisition device, such as a CT scanner or MRI scanner, or the 3D volume can be received by loading a previously stored 3D volume from a storage or memory of a computer.

At step 404, the heart chambers are segmented in the 3D volume. The heart chambers are segmented and used to predict initial positions of the coronary arteries. In an advantageous embodiment, the heart chambers may be segmented using a marginal space learning (MSL) based approach.

In particular, the heart chamber segmentation can be formulated as a two-step learning problem: anatomical structure localization and boundary delineation. Object localization (or detection) is required for an automatic segmentation system and discriminative learning approaches have been proven to be efficient and robust for solving many 2D object detection problems. In these methods, object localization is formulated as a classification problem: whether an image block contains the target object or not. The parameter space was quantized into a large set of discrete hypotheses. Each hypothesis is tested by a trained classifier to get a detection score. The hypothesis with the highest score is taken as the final detection result. Exhaustive searching makes the system robust under local optima, however, it is too time consuming to search a nine-dimensional transformation space (three for position, three for orientation, and three for anisotropic scaling) for 3D object detection. Marginal space learning (MSL) can be used to apply machine learning to 3D object detection. The idea of MSL is not to learn a monolithic classifier directly in the full similarity transformation parameter space but to incrementally learn classifiers on marginal spaces. In particular, the detection of each heart chamber can be slit into three problems: position estimation, position-orientation estimation, and position-orientation-scale estimation. A separate classifier is trained based on annotated training data for each of these estimation problems. The classifiers in the lower dimensional marginal spaces are used to prune the searching space efficiently. This object localization stage results in an estimated transformation (position, orientation, and scale) of the object (e.g., heart chamber).

After automatic object localization, the mean shape model of the object is aligned with the estimated transformation to get a rough estimate of the object shape. The shape is then deformed locally to fit the object boundary. Active shape models (ASM) can be used to deform an initial estimate of a non-rigid shape under the guidance of the image evidence and the shape prior. However, a non-learning based generic boundary detector, as used in conventional ASM applications, does not work effectively in heart chamber deformation due to the complex background and weak edges. Instead, a learning based boundary detector can be used to exploit more image evidences to achieve a robust boundary detection. Additional details regarding MSL-based heart chamber segmentation are described in U.S. Pat. No. 7,916,919, issued Mar. 29, 2011, and entitled "System and Method for Segmenting Chambers of a Heart in a Three Dimensional Image", which is incorporated herein by reference.

Figure 5:
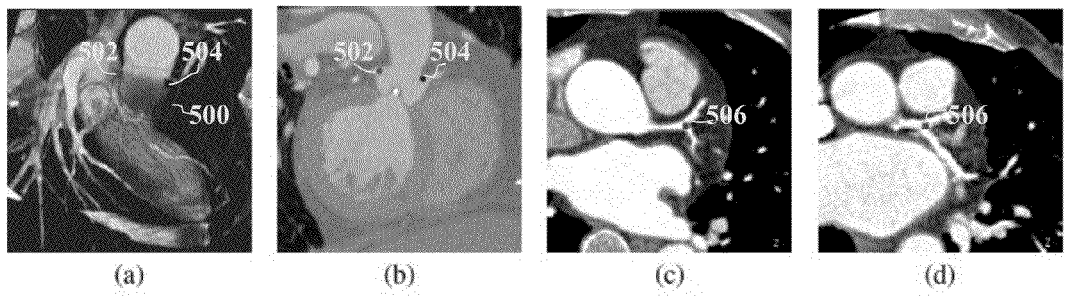
FIG. 5 illustrates exemplary coronary landmark detection results.

At step 406, coronary landmarks are detected in the 3D volume. Using the heart chambers for prediction can result in a rough estimate of the coronary arteries. An initial estimate of the coronary arteries can be significantly improved if certain coronary landmarks are detected and used for alignment. The left and right coronary ostia are the most prominent coronary landmarks, where the coronary arteries originate. As an anatomical structure, the coronary ostia have strong constraints that facilitate automatic detection of the ostia. For example, a patient contains two (and only two) coronary ostia and the left/right ostium is located on the left/right cusp of the aortic root, respectively (ignoring the low prevalence of anomalies). For chronic total occlusion patients, the proximal arteries around the coronary ostia may be completely obstructed thus not visible in a cardiac CT volume. However, the correct ostia position can still be inferred from the surrounding tissues. According to an advantageous implementation, an efficient and robust method can be used to detect both coronary ostia as a global object. Different from previous methods of ostia detection, no explicit aorta segmentation is necessary. There are two coronary ostia, and although it is possible to detect each independently, the detection results may be inconsistent in geometry. Also, computation power is wasted by ignoring the strong geometric constraint between the two ostia. In embodiments of the present invention, the left and right ostia are detected together as a global object (a bounding box) including with both coronary ostia. The position, orientation, and scale of this global box can be detected in the 3D volume by a series of classifiers using MSL-based segmentation. From the position, orientation, and scale of this global object, the position of individual ostium can be determined. The bounding box can be defined as a cube with one side aligned with the direction connecting the left and right coronary ostia and another side aligned with the aortic root centerline. The coronary ostia are located at the center of two opposite faces of the cube. FIG. 5 illustrates exemplary coronary landmark detection results. Images (a) and (b) of FIG. 5 show the detected bounding box 500 for the coronary ostia, as well as the left coronary ostia 502 and the right coronary ostia 504 detected by detecting the bounding box 500.

The LM artery bifurcation is another important coronary landmark, on which the left coronary artery bifurcates into the LAD and LCX. The length of the LM varies a large amount, for example from 2 mm to 40 mm. Detection of the LM bifurcation is important to determine the course of the LM and the proximal segments of the LAD and LCX. An LM bifurcation detector can be trained using a machine learning based approach. In particular, a classifier can be trained using steerable features, and the classifier can determine a probability that a particular voxel is at the LM bifurcation. For example, the LM bifurcation detector/classifier can be trained based on training data using a Probabilistic Boosting Tree (PBT), but the present invention is not limited thereto. During detection, the detected coronary ostia can be used to predict the location of the LM bifurcation. The trained LM bifurcation detector can then be constrained to an area surrounding this initial prediction. For example, all voxels inside a cube of a predetermined size (e.g., 20 mm in length) centered at the initial LM bifurcation prediction can be tested using the trained LM bifurcation detector. The final detected bifurcation can be determined as the average of a top number (e.g., 20) of detected position candidates, which have the largest classification scores. Images (c) and (d) of FIG. 5 each show a detected LM artery bifurcation 506.

Figure 6:
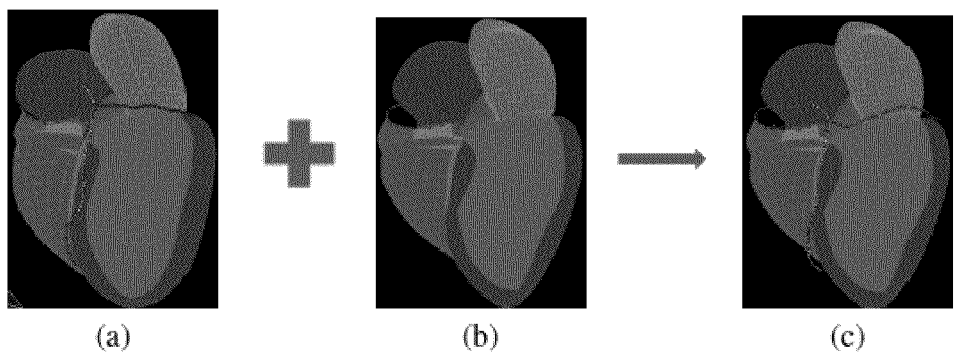
FIG. 6 illustrates predicting initial positions of the coronary artery centerlines using the segmented heart chambers.

Returning to FIG. 4, at step 408, the coronary artery centerlines are initialized based on the segmented heart chambers and the detected coronary landmarks. Since the partial coronary artery models are embedded in the mean heart chamber model, the segmented heart chambers can be used to predict the initial position of the coronary arteries. In particular, since the heart chambers are available on both the mean shape and have been segmented in the input 3D volume, the heart chambers can be used to estimate a deformation field to deform the partial coronary artery centerline models to give an initial estimate of the positions of the coronary artery centerlines in the input 3D volume. FIG. 6 illustrates predicting initial positions of the coronary artery centerlines using the segmented heart chambers. Image (a) of FIG. 6 shows the mean shape model of the heart chambers including the embedded coronary arteries. Image (b) of FIG. 6 shows the segmented heart chambers in an input 3D volume. Image (c) of FIG. 6 shows an initial prediction of the coronary arteries in the input 3D volume based on a deformation field estimated from the segmented heart chambers A thin plate spline (TPS) model is a well-known technique that can be used to estimate the deformation field. The TPS deformation field minimizes the bending energy of a thin plate. Other parametric or non-parametric deformation fields can also be used as well. However, the TPS deformation field is advantageous because (1) the interpolation is smooth with derivatives of any order; (2) the model has no free parameters that need manual tuning; (3) it has closed-form solutions for both warping and parameter estimation; and (4) there is a physical explanation for its energy function. The computational complexity of TPS deformation field estimation is $O(N^3)$, where N is the number of anchor points. In one implementation, the heart chamber model described herein is represented with 3582 mesh points. A large amount of computational time is required if all mesh points are used as anchor points for TPS deformation. Since a coronary artery runs around a specific part of the heart chambers, its deformation field is well defined by the neighboring mesh points. During training, the average distance from a mesh point to each coronary artery is calculated. For each artery, the indexes of a number (e.g., 100) of the closest points are recorded. During coronary prediction for each coronary artery, the recorded mesh points for that coronary artery selected as anchor points to estimate the TPS deformation field. Accordingly to an advantageous embodiment of the present invention, the detected coronary landmarks can also be added as anchor points. In particular, for the LAD, the left coronary ostium, LM bifurcation, and 100 points on the heart chamber mesh (most of them come from the left and right ventricles) can be used to estimate the deformation field. In an advantageous embodiment, the LM coronary artery is merged with the LAD during TPS warping, such that the same deformation field can be used to warp the LAD and the LM arteries. The LM bifurcation and the right coronary ostium are used, along with the points on the heart chamber mesh, as anchor points for the LCX and the RCA deformation field estimation, respectively. Therefore, instead of using all mesh points (3000+) to estimate one global deformation field, three deformation fields (using 101 or 102 points) can be calculated to separately warp the coronary arteries. Using a small number of neighboring mesh points as anchor points has advantages over using all of the mesh points in that the TPS deformation field estimation and warping are much faster, and the predicted coronary arteries are more accurate since irrelevant mesh points (which are far away from the coronary arteries) are excluded.

Returning to FIG. 4, at step 410, the coronary artery centerlines are locally refined. For each coronary artery, the initial coronary centerline is close to the true position, however not accurate. A dynamic programming based optimization is applied to refine the initial centerline path. The initial centerline can be represented as a set of evenly distributed points $P_i$, for i=0, 1, . . . , n−1. For each point $P_i$, a number of candidate positions $P_i^j$ are uniformly sampled on a plane perpendicular to the centerline path at that point. In a possible implementation, 41×41 candidates $P_i^j$ can be uniformly sampled for each point $P_i$, and the candidates $P_i^j$ are sampled on a regular grid of 20×20 mm$^2$ with grid spacing of 0.5 mm. The problem of how to select the best position for each point $P_i$ can be formulated as a shortest path computation problem:

$$\overline{P}_0^{J(0)}, \overline{P}_1^{J(1)}, \ldots, \overline{P}_{n-1}^{J(n-1)} = \underset{P_i^{J(i)}}{\mathrm{argmin}} \sum_{i=0}^{n-1} C(P_i^{J(i)}) + w \sum_0^{n-2} D(P_i^{J(i)}, P_{i+1}^{J(i+1)}). \quad (1)$$

The first term is the cost C for a single node, measuring the likelihood that this point is at the center of the vessel. The second term is the total length of the path determined by summing the Euclidean distance D between each set of two neighboring points on the path. The free parameter w tunes the weight between the two terms. The optimal path can be calculated efficiently by minimizing the above cost function using dynamic programming.

A vesselness measure may be used as the cost C of a node in Equation (1). Actually, a negated vesselness measure can be used, since vesselness measures typically have high scores in the center of a vessel. Various vesselness measurements can be used, such as the well known Hessian vesselness, medialness, and cylinder model based vesselness measures. An empirically designed measurement is by no means optimal in the use of image context information. Due to the strong tubular shape assumption embedded in the above vesselness measurements, the branch junctions often get a low vesselness score that is comparable to background voxels. In an advantageous implementation, a machine learning based vesselness can be used, which exploits the rich domain of specific knowledge embedded in an expert-annotated dataset. For each voxel, a set of geometric and image features is extracted. A probabilistic boosting tree (PBT) can be used to train a classifier, which assigns a high score to voxels inside the artery and a low score to those outside. The trained classifier can be applied to the voxels at the candidate locations, and the detection score can be treated as a vesselness measurement in the computation of the shortest path.

Figure 7:
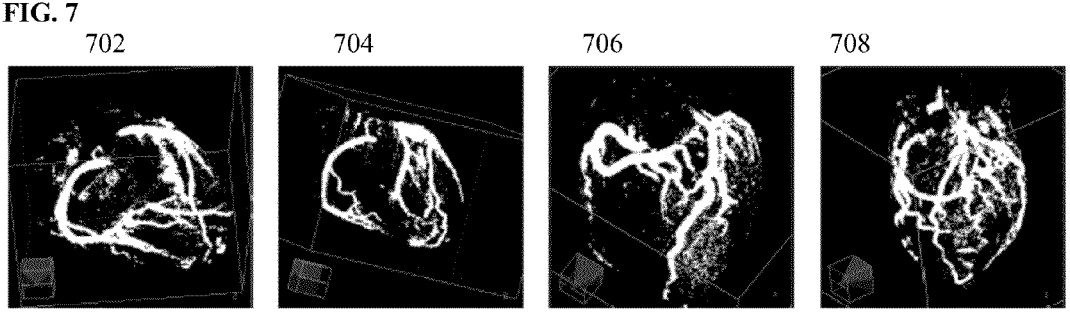
FIG. 7 illustrates exemplary machine learning based vesselness measurements.

Experiments by the present inventors show that the machine learning based vesselness measure outperforms the Hessian vesselness in both speed and accuracy. Furthermore, the machine learning based vesselness measure preserves the branch junctions quite well. In generating the training samples to train the vesselness classifier, voxels outside the lumen (e.g., at least 5 mm away from the lumen) are used as negative samples, voxels at the center of the lumen are used as positive samples, and the remaining voxels are ignored (assigned to neither the positive nor negative set). Using the smoothness interpolation intrinsic to the boosting classifier, this vesselness peaks at the lumen center and gradually decreases toward the lumen wall. FIG. 7 illustrates exemplary machine learning based vesselness measurements. In particular FIG. 7 shows probability maps 702, 704, 706, and 708 visualizing voxel classification scores using a trained vesselness classifier. In images 702, 704, 706, and 708, the voxel classification score is thresholded for visualization purposes.

Returning to FIG. 4, at step 412, each coronary artery centerline is shrunk to verify that it is inside the respective coronary artery. The model-driven stage (steps 404-410) is robust under severe occlusions of a coronary artery. However, it only models the consistent part of a coronary artery, which corresponds to the proximal and middle segments of an artery. In embodiments of the present invention, the model-driven stage is combined with a data-driven stage (steps 412-414) to handle the anatomical variations. The data-driven stage provides centerline verification (step 412) and centerline extension (step 414) for the coronary artery centerlines extracted in the model-driven stage.

The coronary artery centerline generated by the model-driven step may be too long for a few datasets (e.g., for the 5% shortest LADs excluded from the model training). The distal end of the detected coronary centerline may be traced to a non-coronary structure. The coronary artery centerline is shrunk by checking each end point one by one using the vesselness score. An end point is removed if its vesselness is less than a threshold. In an advantageous implementation, in order to improve robustness, the centerline for each coronary artery is shrunk until at least three points are found with vesselness larger than the threshold. The shrinking process may be tuned to a high vesselness threshold, and it does not matter if some good points are removed since the centerline will be extended later to recover the full length of the coronary.

At step 414, the coronary arteries are extended using vessel tracing. After shrinking, the centerline from the current end point using a greedy search procedure with shortest path computation. Again, the learning-based vesselness can be used as cost for each node on the path. Starting from the end point of the current coronary artery centerline, all possible paths of a particular length are considered. In a possible implementation, all possible paths of 10 voxels length can be considered. The best path among the possible paths is selected (using Equation (1)) and appended to the current centerline. It is then determined if selected path is considered a good path. It can be determined if the path is a good path by calculating the total cost of the path or the average cost of the path (i.e., total cost of the path divided by the number of voxels (e.g., 10) in the path), and comparing the total cost or average cost of the path to a threshold. If it is determined that a good path has been selected (with a path cost smaller than the threshold), the vessel tracing procedure continues from the new end point. If it is determined that the selected path is not a good path (e.g., path cost greater than the threshold), the tracing procedure may terminate. Alternatively, if it is determined that the selected path is not a good path, the path can be reduced to a smaller number of voxels (e.g., reduced from 10 to 5 voxels). It can then be determined whether the reduced path is a good path. If the reduced path determined to be a good path, it is kept and if the reduced path is determined not to be a good path it is discarded.

At step 416, the coronary artery centerline extraction results are output. Steps 404-414 can be performed to extract a centerline each of the LM, LAD, LCX, and RCA coronary arteries. The extracted coronary artery centerlines can be output by displaying the coronary artery centerlines, for example, on a display device of a computer system or by storing the extracted coronary artery centerlines on a storage or memory of a computer system.

Figure 8:
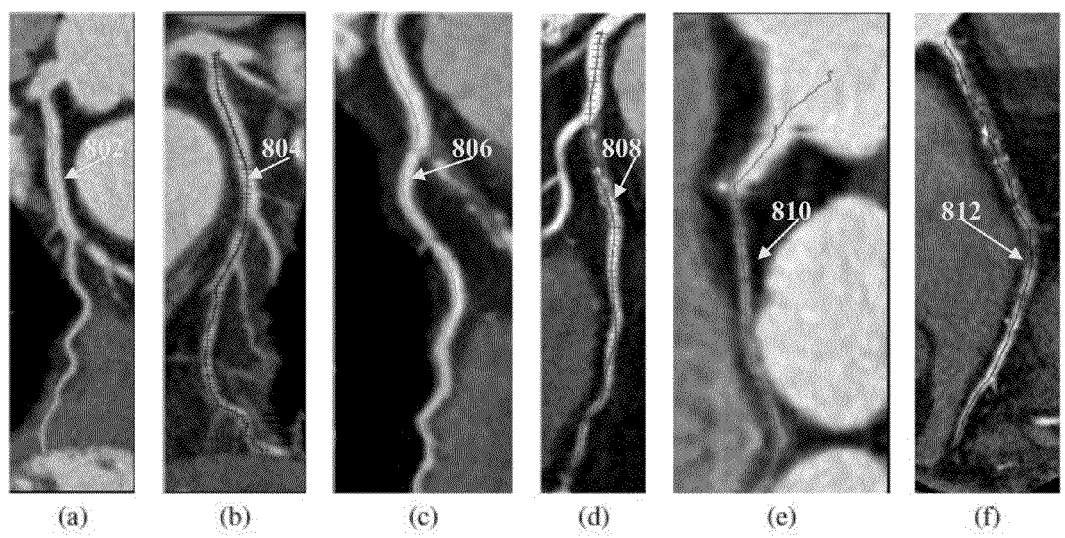
FIG. 8 illustrates exemplary coronary artery centerline extraction results.

FIG. 8 illustrates exemplary coronary artery centerline extraction results. Images (a)-(f) of FIG. 8 are curved multi-planar reformation views showing coronary artery centerline extraction results on three CT datasets. Image (a) shows an LCX centerline 802 extracted from a first CT dataset using only a data-driven approach, and image (b) shows an LCX centerline 804 extracted from the first CT dataset using the method of FIG. 4. Image (c) shows an LAD centerline 806 extracted from a second CT dataset using the data-driven approach, and image (d) shows an LAD centerline 808 extracted from the second CT dataset using the method of FIG. 4. Image (e) shows an RCA centerline 810 extracted from a third CT dataset using the data-driven approach, and image (f) shows an RCA centerline 812 extracted from the third CT dataset using the method of FIG. 4. As shown in FIG. 8, the method of FIG. 4 outperforms the data-driven only approach in extracting coronary arteries having occlusions.

Figure 9:
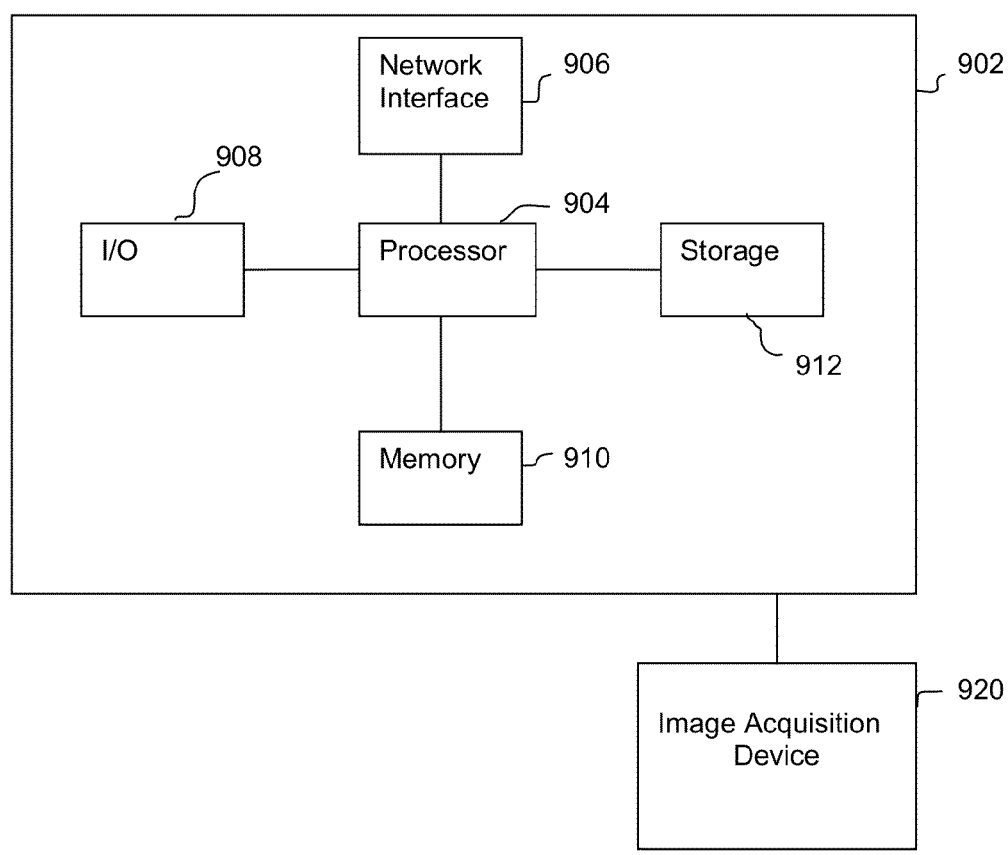
FIG. 9 is a high level block diagram of a computer capable of implementing the present invention.

The above-described methods for coronary artery centerline extraction may be implemented on a computer using well-known computer processors, memory units, storage devices, computer software, and other components. A high level block diagram of such a computer is illustrated in FIG. 9. Computer 902 contains a processor 904 which controls the overall operation of the computer 902 by executing computer program instructions which define such operation. The computer program instructions may be stored in a storage device 912, or other computer readable medium (e.g., magnetic disk, CD ROM, etc.) and loaded into memory 910 when execution of the computer program instructions is desired. Thus, the steps of the method of FIG. 4 may be defined by the computer program instructions stored in the memory 910 and/or storage 912 and controlled by the processor 904 executing the computer program instructions. An image acquisition device 920, such as a CT scanner or MR scanner, can be connected to the computer 902 to input images to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.). One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of extracting at least one coronary artery centerline from a 3D volume, comprising:
  segmenting heart chambers in the 3D volume;

initializing a coronary artery centerline in the 3D volume for at least a portion of at least one coronary artery based on the segmented heart chambers;

locally refining points of the coronary artery centerline;

shrinking a length of the coronary artery centerline to verify that the coronary artery centerline is within the at least one coronary artery; and extending the coronary artery centerline using vessel tracing after shrinking the length of the coronary artery centerline to verify that the coronary artery centerline is within the at least one coronary artery.

2. The method of claim 1, wherein the step of segmenting heart chambers in the 3D volume comprises:

segmenting the heart chambers in the 3D volume using marginal space learning (MSL) based segmentation.

3. The method of claim 1, wherein the step of initializing a coronary artery centerline in the 3D volume for at least a portion of at least one coronary artery based on the segmented heart chamber comprises:

determining an initial position of the coronary artery centerline in the 3D volume from the segmented heart chambers based on a relative position of a mean coronary artery centerline model for the at least one coronary artery to mean heart chamber models in a learned mean shape model.

4. The method of claim 3, wherein the step of determining an initial position of the coronary artery centerline in the 3D volume from the segmented heart chambers based on a relative position of a mean coronary artery centerline model to mean heart chamber models in a learned mean shape model comprises:

calculating a deformation field from the learned mean shape model to the 3D volume based on the segmented heart chambers; and warping the mean coronary artery centerline model from the learned mean shape model to the 3D volume using the deformation field.

5. The method of claim 3, wherein the at least one coronary artery comprises a left main (LM) coronary artery, a left anterior descending (LAD) coronary artery, a left circumflex (LCX) coronary artery, and a right coronary artery (RCA), and the mean shape model includes:

a mean LM coronary artery model;

a mean LAD coronary artery model of a truncated portion of the LAD coronary artery based on a relative length of the LAD coronary artery and a distance between a left coronary ostium and a left ventricular apex in each of a plurality of training volumes;

a mean LCX coronary artery model of a truncated portion of the LCX coronary artery based on a relative length of the LCX coronary artery and an atrio-ventricular groove in each of the plurality of training volumes; and a mean RCA coronary artery model of a truncated portion of the RCA coronary artery based on a relative length of the RCA coronary artery and the atrio-ventricular groove in each of the plurality of training volumes.

6. The method of claim 1, further comprising detecting at least one coronary landmark in the 3D volume, wherein the step of initializing a coronary artery centerline in the 3D volume for at least a portion of at least one coronary artery based on the segmented heart chamber comprises:

determining an initial position of the coronary artery centerline in the 3D volume from the segmented heart chambers and the detected at least one coronary landmark based on a relative position of a mean coronary artery centerline model for the at least one coronary artery to mean heart chamber models and the at least one coronary landmark in a learned mean shape model.

7. The method of claim 6, wherein the step of determining an initial position of the coronary artery centerline in the 3D volume from the segmented heart chambers and the detected at least one coronary landmark based on a relative position of a mean coronary artery centerline model for the at least one coronary artery to mean heart chamber models and the at least one coronary landmark in a learned mean shape model comprises:

calculating a deformation field from the learned mean shape model to the 3D volume based on a plurality of mesh points in the segmented heart chambers and the detected at least one coronary landmark; and warping the mean coronary artery centerline model from the learned mean shape model to the 3D volume using the deformation field.

8. The method of claim 7, wherein the at least one coronary artery comprises a left main (LM) coronary artery, a left anterior descending (LAD) coronary artery, a left circumflex (LCX) coronary artery, and a right coronary artery (RCA); the at least one coronary artery landmark comprises a left coronary ostium, a right coronary ostium, and an LM bifurcation; and the step of calculating a deformation field from the learned mean shape model to the 3D volume based on a plurality of mesh points in the segmented heart chambers and the at detected least one coronary landmark comprises:

calculating a deformation field to warp an LM coronary artery centerline model and an LAD coronary artery centerline model based on the left coronary ostium, the LM bifurcation, and a plurality of mesh points closest to the LM and LAD coronary artery centerline models in the mean shape model;

calculating a deformation field to warp an LCX coronary artery centerline model based on the LM bifurcation and a plurality of mesh points closest to the LCX coronary artery centerline model in the mean shape model; and calculating a deformation field to warp an RCA coronary artery centerline model based on the right coronary ostium and a plurality of mesh points closest to the RCA coronary artery centerline model in the mean shape model.

9. The method of claim 1, wherein the step of locally refining points of the coronary artery centerline comprises:

generating candidate positions for each of the points of the coronary artery centerline in a plane perpendicular to the coronary artery centerline; and selecting the best candidate position for each of the points of the coronary artery centerline using a dynamic programming based shortest path computation based on a vesselness measure at each candidate position.

10. The method of claim 1, wherein the step of shrinking a length of the coronary artery centerline to verify that the coronary artery centerline is within the at least one coronary artery comprises:

removing end points from the coronary artery centerline until a vesselness score for a certain number of end points is above a threshold.

11. The method of claim 10, wherein the step of removing end points from the coronary artery centerline until a vesselness score for a certain number of end points is above a threshold comprises:

removing end points from the coronary artery until three consecutive end points have a vesselness score that is above the threshold.

12. The method of claim 1, wherein the step of extending the coronary artery centerline using vessel tracing comprises:

(a) determining a plurality of possible paths of a particular length from a current end point of the coronary artery centerline;
(b) selecting a best path of the plurality of possible paths using a shortest path computation based on a vesselness measure; and
(c) repeating steps (a) and (b) until it is determined that a distal end of the at least one coronary artery is reached.

13. The method of claim 12, wherein step (c) comprises:
determining a cost of the selected best path based on the vesselness measure at each point in the selected best path;
if the cost of the selected best path is less than a threshold, determining that the distal end of the at least one coronary artery is not reached and repeating steps (a) and (b); and
if the cost of the selected best path is greater than a threshold, determining that the distal end of the at least one coronary artery is reached.

14. An apparatus for extracting at least one coronary artery centerline from a 3D volume, comprising:
means for segmenting heart chambers in the 3D volume;
means for initializing a coronary artery centerline in the 3D volume for at least a portion of at least one coronary artery based on the segmented heart chambers;
means for locally refining points of the coronary artery centerline;
means for shrinking a length of the coronary artery centerline to verify that the coronary artery centerline is within the at least one coronary artery; and
means for extending the coronary artery centerline using vessel tracing after shrinking the length of the coronary artery centerline to verify that the coronary artery centerline is within the at least one coronary artery.

15. The apparatus of claim 14, wherein the means for initializing a coronary artery centerline in the 3D volume for at least a portion of at least one coronary artery based on the segmented heart chamber comprises:
means for determining an initial position of the coronary artery centerline in the 3D volume from the segmented heart chambers based on a relative position of a mean coronary artery centerline model for the at least one coronary artery to mean heart chamber models in a learned mean shape model.

16. The apparatus of claim 15, wherein the at least one coronary artery comprises a left main (LM) coronary artery, a left anterior descending (LAD) coronary artery, a left circumflex (LCX) coronary artery, and a right coronary artery (RCA), and the mean shape model includes:
a mean LM coronary artery model;
a mean LAD coronary artery model of a truncated portion of the LAD coronary artery based on a relative length of the LAD coronary artery and a distance between a left coronary ostium and a left ventricular apex in each of a plurality of training volumes;
a mean LCX coronary artery model of a truncated portion of the LCX coronary artery based on a relative length of the LCX coronary artery and an atrio-ventricular groove in each of the plurality of training volumes; and
a mean RCA coronary artery model of a truncated portion of the RCA coronary artery based on a relative length of the RCA coronary artery and the atrio-ventricular groove in each of the plurality of training volumes.

17. The apparatus of claim 14, further comprising means for detecting at least one coronary landmark in the 3D volume, wherein the means for initializing a coronary artery centerline in the 3D volume for at least a portion of at least one coronary artery based on the segmented heart chamber comprises:
means for determining an initial position of the coronary artery centerline in the 3D volume from the segmented heart chambers and the detected at least one coronary landmark based on a relative position of a mean coronary artery centerline model for the at least one coronary artery to mean heart chamber models and the at least one coronary landmark in a learned mean shape model.

18. The apparatus of claim 14, wherein the means for locally refining points of the coronary artery centerline comprises:
means for generating candidate positions for each of the points of the coronary artery centerline; and
means for selecting the best candidate position for each of the points of the coronary artery centerline.

19. The apparatus of claim 14, wherein the means for extending the coronary artery centerline using vessel tracing comprises:
means for selecting a best path of the plurality of possible paths using a shortest path computation based on a vesselness measure; and
means for determining whether a distal end of the at least one coronary artery is reached.

20. A non-transitory computer readable medium storing computer program instructions, which when executed on a processor, cause the processor to perform a method of extracting at least one coronary artery centerline from a 3D volume, the method comprising:
segmenting heart chambers in the 3D volume;
initializing a coronary artery centerline in the 3D volume for at least a portion of at least one coronary artery based on the segmented heart chambers;
locally refining points of the coronary artery centerline;
shrinking a length of the coronary artery centerline to verify that the coronary artery centerline is within the at least one coronary artery; and
extending the coronary artery centerline using vessel tracing after shrinking the length of the coronary artery centerline to verify that the coronary artery centerline is within the at least one coronary artery.

21. The non-transitory computer readable medium of claim 20, wherein the step of initializing a coronary artery centerline in the 3D volume for at least a portion of at least one coronary artery based on the segmented heart chamber comprises:
determining an initial position of the coronary artery centerline in the 3D volume from the segmented heart chambers based on a relative position of a mean coronary artery centerline model for the at least one coronary artery to mean heart chamber models in a learned mean shape model.

22. The non-transitory computer readable medium of claim 21, wherein the at least one coronary artery comprises a left main (LM) coronary artery, a left anterior descending (LAD) coronary artery, a left circumflex (LCX) coronary artery, and a right coronary artery (RCA), and the mean shape model includes:
a mean LM coronary artery model;
a mean LAD coronary artery model of a truncated portion of the LAD coronary artery based on a relative length of the LAD coronary artery and a distance between a left coronary ostium and a left ventricular apex in each of a plurality of training volumes;
a mean LCX coronary artery model of a truncated portion of the LCX coronary artery based on a relative length of the LCX coronary artery and an atrio-ventricular groove in each of the plurality of training volumes; and a mean RCA coronary artery model of a truncated portion of the RCA coronary artery based on a relative length of the RCA coronary artery and the atrio-ventricular groove in each of the plurality of training volumes.

23. The non-transitory computer readable medium of claim 20, wherein the method further comprises detecting at least one coronary landmark in the 3D volume, and the step of initializing a coronary artery centerline in the 3D volume for at least a portion of at least one coronary artery based on the segmented heart chamber comprises:

determining an initial position of the coronary artery centerline in the 3D volume from the segmented heart chambers and the detected at least one coronary landmark based on a relative position of a mean coronary artery centerline model for the at least one coronary artery to mean heart chamber models and the at least one coronary landmark in a learned mean shape model.

24. The non-transitory computer readable medium of claim 23, wherein the step of determining an initial position of the coronary artery centerline in the 3D volume from the segmented heart chambers and the detected at least one coronary landmark based on a relative position of a mean coronary artery centerline model for the at least one coronary artery to mean heart chamber models and the at least one coronary landmark in a learned mean shape model comprises:

calculating a deformation field from the learned mean shape model to the 3D volume based on a plurality of mesh points in the segmented heart chambers and the detected at least one coronary landmark; and warping the mean coronary artery centerline model from the learned mean shape model to the 3D volume using the deformation field.

25. The non-transitory computer readable medium of claim 24, wherein the at least one coronary artery comprises a left main (LM) coronary artery, a left anterior descending (LAD) coronary artery, a left circumflex (LCX) coronary artery, and a right coronary artery (RCA); the at least one coronary artery landmark comprises a left coronary ostium, a right coronary ostium, and an LM bifurcation; and the step of calculating a deformation field from the learned mean shape model to the 3D volume based on a plurality of mesh points in the segmented heart chambers and the at detected least one coronary landmark comprises:

calculating a deformation field to warp an LM coronary artery centerline model and an LAD coronary artery centerline model based on the left coronary ostium, the LM bifurcation, and a plurality of mesh points closest to the LM and LAD coronary artery centerline models in the mean shape model;

calculating a deformation field to warp an LCX coronary artery centerline model based on the LM bifurcation and a plurality of mesh points closest to the LCX coronary artery centerline model in the mean shape model; and calculating a deformation field to warp an RCA coronary artery centerline model based on the right coronary ostium and a plurality of mesh points closest to the RCA coronary artery centerline model in the mean shape model.

26. The non-transitory computer readable medium of claim 20, wherein the step of locally refining points of the coronary artery centerline comprises:

generating candidate positions for each of the points of the coronary artery centerline in a plane perpendicular to the coronary artery centerline; and selecting the best candidate position for each of the points of the coronary artery centerline using a dynamic programming based shortest path computation based on a vesselness measure at each candidate position.

27. The non-transitory computer readable medium of claim 20, wherein the step of shrinking a length of the coronary artery centerline to verify that the coronary artery centerline is within the at least one coronary artery comprises:

removing end points from the coronary artery centerline until a vesselness score for a certain number of end points is above a threshold.

28. The non-transitory computer readable medium of claim 20, wherein the step of extending the coronary artery centerline using vessel tracing comprises:

(a) determining a plurality of possible paths of a particular length from a current end point of the coronary artery centerline;

(b) selecting a best path of the plurality of possible paths using a shortest path computation based on a vesselness measure; and (c) repeating steps (a) and (b) until it is determined that a distal end of the at least one coronary artery is reached.

29. The non-transitory computer readable medium of claim 28, wherein step (c) comprises:

determining a cost of the selected best path based on the vesselness measure at each point in the selected best path;

if the cost of the selected best path is less than a threshold, determining that the distal end of the at least one coronary artery is not reached and repeating steps (a) and (b); and if the cost of the selected best path is greater than a threshold, determining that the distal end of the at least one coronary artery is reached.

* * * * *